US009290118B2

(12) United States Patent  (10) Patent No.: US 9,290,118 B2
Vue  (45) Date of Patent: Mar. 22, 2016

(54) HEATED FLIGHT ATTENDANT JUMPSEATS FOR COMMERCIAL AIRPLANE APPLICATIONS

(71) Applicant: The Boeing Company, Seal Beach, CA (US)

(72) Inventor: Fue C Vue, Mill Creek, WA (US)

(73) Assignee: THE BOEING COMPANY, Chicago, IL (US)

(*) Notice: Subject to any disclaimer, the term of this patent is extended or adjusted under 35 U.S.C. 154(b) by 163 days.

(21) Appl. No.: 14/048,321

(22) Filed: Oct. 8, 2013

(65) Prior Publication Data

US 2015/0097399 A1    Apr. 9, 2015

(51) Int. Cl.
*B64D 11/06* (2006.01)
*B60N 2/56* (2006.01)
*B60N 2/30* (2006.01)
*B60N 2/38* (2006.01)
*B64C 1/18* (2006.01)
*B64D 13/06* (2006.01)

(52) U.S. Cl.
CPC ............... *B60N 2/56* (2013.01); *B60N 2/3045* (2013.01); *B60N 2/38* (2013.01); *B64C 1/18* (2013.01); *B64D 11/0626* (2014.12); *B64D 11/0691* (2014.12); *B64D 13/06* (2013.01); *B64D 2013/0655* (2013.01); *Y10T 29/49826* (2015.01)

(58) Field of Classification Search
CPC ........ B64D 11/06; B64D 25/04; B64D 11/00; B64D 25/10; Y02T 50/46; B60H 1/2225; B60H 1/2218; B60S 1/3805
USPC ...................................... 244/122 R; 219/202
See application file for complete search history.

(56) References Cited

U.S. PATENT DOCUMENTS

| 3,472,289 | A  | * | 10/1969 | Riordan et al. ............ 139/425 R |
| 5,955,972 | A  | * | 9/1999  | Wade ............................. 340/960 |
| 6,105,667 | A  | * | 8/2000  | Yoshinori et al. ............. 165/202 |
| 6,897,417 | B1 | * | 5/2005  | Usselman et al. ............ 219/528 |
| 7,823,967 | B2 | * | 11/2010 | Parnis et al. ............. 297/180.12 |
| 7,827,805 | B2 | * | 11/2010 | Comiskey et al. ............... 62/3.3 |
| 2003/0011493 | A1 | * | 1/2003 | Wiplinger ...................... 340/960 |
| 2005/0098684 | A1 | * | 5/2005 | Gullerud ................ B64D 13/08 244/129.1 |
| 2006/0214480 | A1 | * | 9/2006 | Terech ...................... 297/180.13 |
| 2006/0289421 | A1 | * | 12/2006 | Axinte et al. .................. 219/217 |
| 2007/0034622 | A1 | * | 2/2007 | Ruminski ...................... 219/528 |
| 2009/0051196 | A1 | * | 2/2009 | Ishii et al. ................ 297/180.12 |
| 2009/0101632 | A1 | * | 4/2009 | Naylor .......................... 219/202 |
| 2009/0289045 | A1 | * | 11/2009 | Hotary ......................... 219/202 |
| 2010/0187213 | A1 | * | 7/2010 | Cheatham, II ................ 219/202 |
| 2013/0025310 | A1 | * | 1/2013 | Itoh .................................. 62/186 |
| 2013/0066487 | A1 | * | 3/2013 | Holder ............................ 701/14 |
| 2014/0373563 | A1 | * | 12/2014 | Mizutani et al. ................ 62/186 |

FOREIGN PATENT DOCUMENTS

| DE | WO 2013139780 A1 | * | 9/2013 | ............ B64D 11/06 |
| EP | 0364649          |   | 4/1990 |                      |
| EP | 2233046          |   | 9/2010 |                      |
| WO | WO03016091       |   | 2/2003 |                      |

* cited by examiner

*Primary Examiner* — Assres H Woldemaryam
(74) *Attorney, Agent, or Firm* — Parsons Behle & Latimer

(57) ABSTRACT

The disclosure provides systems and methods for a heating system with a seat having a first heating element, a floor heating panel located at least partially under the seat, and a controller operatively coupled to the first heating element and the floor heating panel and configured to implement control logic that receives at least one input and thereby control the first heating element and the floor heating panel.

15 Claims, 2 Drawing Sheets

HEATED FLIGHT ATTENDANT JUMPSEATS FOR COMMERCIAL AIRPLANE APPLICATIONS

FIELD OF THE DISCLOSURE

This disclosure relates to heating systems for occupant comfort on an aircraft. In particular, the disclosure relates to supplemental heating systems for use with an attendant jump seat located in the door and galley areas of aircraft.

BACKGROUND

Certain aircraft, such as commercial airplanes, often include environmental control systems, such as air conditioners and heaters, in order to keep the cabin temperature in a range comfortable for the occupants of the airplane. Although existing systems are effective in achieving cabin temperatures within an acceptable comfort range, temperature gradients within the cabin often exist, particularly for larger cabins, and occupants may experience "hot" or "cold" spots in some areas of the cabin.

In particular, some larger aircraft often have cold spots in the area around the doors or galleys of the airplane where factors such as heat loss due to airplane structure, insufficient insulation in and around the doors, and insufficient heat addition may contribute to the creation of a cold spot. Other factors may also contribute to the creation of temperature gradients in the cabin of an aircraft.

Such a cold spot can be particularly uncomfortable for persons that spend any appreciable time in the doorway or galley areas. For example, flight attendants or crew on a commercial aircraft are often seated in a jump seat in the doorway or galley area, and situations such as long duration night time flying with low activity in the cabin or turbulence may cause the crew to remain seated for extended periods.

Prior solutions to alleviate cold areas have included adding one or more of an electrical door air heater to flow warm air across the base of exit door bustles, electrically heated floor panels, heated sidewall panels, and heated door liner surface panels to address the temperature loss in door and galley areas. One drawback of these existing solutions is that because they heat the air, or the surfaces near the floor or door, they are less effective in providing direct thermal comfort to the persons located in the cold area.

Furthermore, these surface and air heaters are typically designed to be constantly powered on in order to sufficiently heat the cold space. Therefore, without proper operational control, adding these supplemental heating systems in areas such as doorways and galleys where occupancy is often transitory and temporary can be expensive and inefficient. Other drawbacks of existing solutions also exist.

SUMMARY

Accordingly, the present disclosure provides systems and methods for providing thermal comfort to persons in cold areas of aircraft cabins.

In addition, the disclosure provides systems and methods for a heating system comprising a seat having a first heating element, a floor heating panel located at least partially under the seat, and a controller operatively coupled to the first heating element and the floor heating panel and configured to implement control logic that receives at least one input and thereby control the first heating element and the floor heating panel.

In addition, some embodiments of the controller may further comprise an input indicative of an in-flight condition of the aircraft within which the heating system is located. In still further embodiments, the in-flight condition may further comprise an indication of the status of the aircraft landing gear.

In addition, some embodiments of the controller may further comprise an input indicative of an environmental control system parameter for the aircraft within which the heating system is located. In still further embodiments, the environmental control system parameter may comprise an indication of the status of the aircraft air conditioning packs.

In addition, some embodiments of the controller may further comprise an input indicative of a temperature of the seat, or an input indicative of ambient temperature of the aircraft within which the heating system is located.

Also disclosed is a method of making a heating system comprising coupling a seat into a vehicle, the seat having a first heating element, coupling a floor heating panel into the vehicle, the floor heating panel being located at least partially under the seat, and coupling a controller into the vehicle, the controller operatively coupled to the first heating element and the floor heating panel and configured to implement control logic that receives at least one input and thereby control the first heating element and the floor heating panel.

In addition, in some embodiments, the method comprises coupling an in-flight sensor to the vehicle wherein the in-flight sensor provides the controller with an input indicative of an in-flight condition of the aircraft within which the heating system is located. In still further embodiments, the input indicative of an in-flight condition further comprises an indication of the status of the aircraft landing gear.

In addition, in some embodiments, the method further comprises coupling an environmental control system sensor to the vehicle wherein the environmental control system sensor provides the controller an input indicative of an environmental control system parameter for the aircraft within which the heating system is located. In still further embodiments, the input indicative of an environmental control system parameter comprises an indication of the status of the aircraft air conditioning packs.

In addition, some embodiments of the method further comprise coupling a temperature sensor to the seat to provide the controller an input indicative of a temperature of the seat, or coupling an ambient temperature sensor to the vehicle to provide the controller an input indicative of ambient temperature of the aircraft within which the heating system is located.

Other advantages and features of the disclosed systems and methods will be apparent from the following detailed description.

Figure 1:
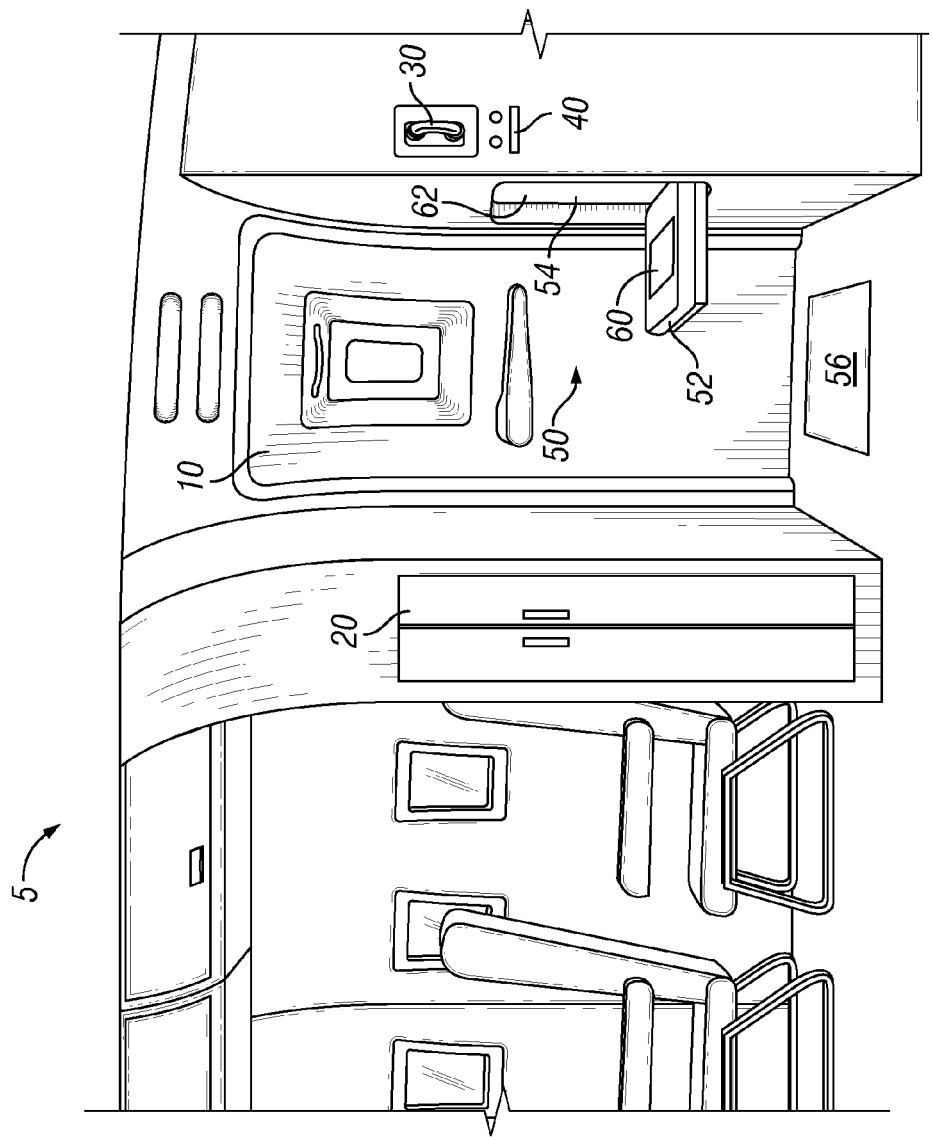
FIG. 1 is an exemplary representation of a doorway or galley area inside an aircraft in accordance with some embodiments of the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is an exemplary representation of a doorway or galley area inside an aircraft in accordance with some embodiments of the disclosure. As shown, a doorway or galley area 5 may be included at various locations within an aircraft. Typically, a doorway or galley area 5 may also include a door 10 suitable for ingress and egress from the aircraft at appropriate times. Lavatory 20 may also be located near doorway or galley area 5. Not pictured, but also often present in doorway or galley area 5 may be a food storage and preparation area. Other common items located in doorway or galley area 5 may include a communication device, such as a telephone 30, and other aircraft controls 40 to operate such systems as cabin temperature control, cabin lights, video displays, safety signs, or the like. Other doorway or galley area 5 configurations are also possible.

As shown in FIG. 1, a doorway or galley area 5 may also include a jump seat 50. As shown, some embodiments of jump seat 50 may comprise a folding or otherwise stowable seat 52 and a seat backrest 54. Numerous other configurations for jump seat 50 are also possible.

As shown in FIG. 1, some embodiments may include a region underneath the jump seat 50 equipped with a floor heating panel 56. The panel 56 may be placed in a location so that when jump seat 50 is occupied, the occupant's feet rest on or near the panel 56. In some embodiments, floor heating panel 56 may be heated by electric-resistance heating coils. Other heating elements are also possible.

As also shown in FIG. 1, some embodiments may include heating elements in jump seat 50. For example, stowable seat 52 may have a heating element 60 integrated within and seat backrest 54 may also have a heating element 62 integrated within.

Heating elements 60, 62 may comprise any suitable system for heating a seat, such as electric resistance heating coils, heating pads, or the like. Other heating elements are also possible.

Figure 2:
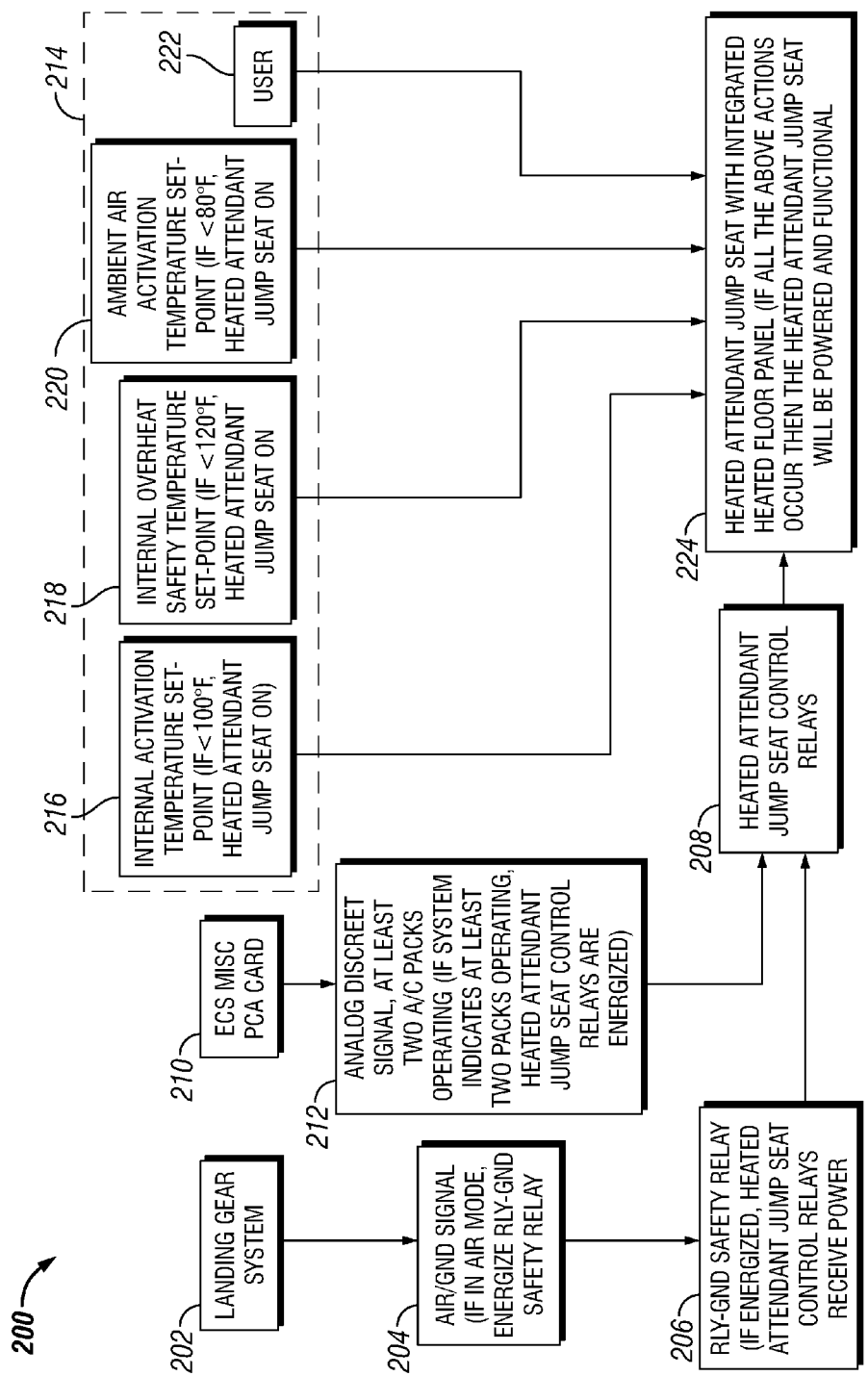
FIG. 2 is a schematic representation of some embodiments of control logic for operation of the jump seat supplemental heat system.

FIG. 2 is a schematic representation of some embodiments of control logic for operation of the supplemental heat system. In general, the control logic 200 for the jump seat supplemental heat system may comprise part of the control logic for the door heat control logic and may operate through existing environmental controls and systems.

As shown in FIG. 2, some embodiments of the jump seat supplemental heat system may include control logic 200 that comprises receiving input from the aircraft landing gear systems 202. For example, landing gear systems 202 may be queried to determine if the aircraft is in flight by reading an AIR/GND signal at 204 that specifies whether the aircraft is airborne. In some embodiments, when an aircraft is airborne, a RLY-GND SAFETY relay 206 will energize and may be used to provide power to energize the jump seat supplemental heat system. For example, the energizing of RLY-GND SAFETY relay 206 may switch on jump seat control relays 208 that provide power to the jump seat heating elements (e.g., floor panel 56, seat element 60, and backrest element 62).

In some embodiments, additional input for the control logic of the jump seat supplemental heat system may be provided by the aircraft environmental control systems (ECS) 210. For example, the ECS 210 may provide, as indicated at 212, an analog discreet signal (e.g., from an ECS 210 MISC PCA card, or the like) that indicates that a predetermined number of air conditioning packs are operating. That signal may then be used to energize the heated jump seat control relays 208. In some embodiments, the predetermined number of air conditioning packs may be one, or two, or more packs.

In some embodiments it may be preferable to also include other control logic criteria 214 as part of control logic 200. Embodiments may include some or all of the following criteria 214. In addition, other control logic criteria 214 are possible.

For example, some embodiments may comprise checking at 216 an internal temperature set point of the heated seat to ensure that the seat is operating within design parameters. Temperatures within the set point may result in a jump seat on signal, and temperatures outside the set point may result in a jump seat off signal. For example, in some embodiments the seat internal temperature set point may be set to 100° F., and for internal seat temperatures below that set point the control logic process 216 will deliver a seat on signal. Other set points are possible.

Another control logic criterion 214 may comprise checking at 218 an overheat temperature set point. For this parameter, temperatures above the set point may result in a jump seat off signal and temperatures below the set point may result in a jump seat on signal. For example, in some embodiments the overheat temperature set point may be set to 120° F., and for internal seat temperatures above that set point control logic process 218 will deliver a seat off signal. Other set points are possible.

Another control logic criterion 214 may comprise checking at 220 an ambient temperature set point of the aircraft cabin. Temperatures above the ambient set point may result in a seat off signal and temperatures below the ambient set point may result in a seat on signal. For example, in some embodiments the ambient temperature set point may be set to 80° F., and for internal seat temperatures above that set point control logic process 220 will deliver a seat off signal. Other set points are possible.

Another control logic criterion 214 may comprise some sort of user input 222. For example, user input may comprise an on/off switch, an adjustable temperature setting, any of floor, back, or seat on/off or temperature settings, or the like to enable the user to customize or adjust the settings, and thus comfort level, of the jump seat 50.

As shown in FIG. 2, when all the various control logic 200 routines are performed, and the various set points and on signals received, then the jump seat 50 will be powered and functional as indicated at 224. Other control logic flows are also possible.

While the above disclosure has been primarily directed to an attendant's jump seat 50, other applications of the disclosed concepts are also possible. For example, the above-disclosed concepts could be applied to a pilot's seat or a passenger's seat. Furthermore, other set points or control logic criteria 214 may be implemented.

Although various embodiments have been shown and described, the present disclosure is not so limited and will be understood to include all such modifications and variations as would be apparent to one skilled in the art.

What is claimed is:

1. A heating system comprising:
 a stowable seat having a first heating element;
 a floor heating panel located at least partially under the seat when the seat is unstowed; and
 a controller operatively coupled to the first heating element and the floor heating panel and configured to implement control logic that receives at least one input including an air-ground signal received from an aircraft landing gear and energizes the first heating element and the floor heating panel when the air-ground signal indicates that the aircraft is airborne.

2. The heating system of claim 1, the at least one input further including an input indicative of an environmental control system parameter for the aircraft.

3. The heating system of claim 2 wherein the input indicative of an environmental control system parameter comprises an indication of the status of an aircraft air conditioning packs.

4. The heating system of claim 1, the at least one input further including an input indicative of a temperature of the stowable seat.

5. The heating system of claim 1, the at least one input further including an input indicative of ambient temperature of the aircraft.

6. A method of making a heating system comprising:

coupling a stowable seat into a vehicle, the seat having a first heating element;

coupling a floor heating panel into the vehicle, the floor heating panel being located at least partially under the seat when the seat is unstowed; and coupling a controller into the vehicle, the controller operatively coupled to the first heating element and the floor heating panel and configured to implement control logic that receives at least one input indicative of an air-ground signal received from a vehicle landing gear and energizes the first heating element and the floor heating panel when the air-ground signal indicates that the vehicle is airborne;

coupling a relay to the vehicle, the at least one input including an input from the relay indicative of the air-ground signal indicating that the vehicle is airborne.

7. The method of claim 6 further comprising:

coupling an environmental control system sensor to the vehicle, the at least one input further including an input indicative of an environmental control system parameter for the vehicle.

8. The method of claim 7 wherein the input indicative of an environmental control system parameter comprises an indication of the status of a vehicle air conditioning packs.

9. The method of claim 6 further comprising:

coupling a temperature sensor to the seat, the at least one input further including an input indicative of a temperature of the seat.

10. The method of claim 6 further comprising:

coupling an ambient temperature sensor to the vehicle, the at least one input further including an input indicative of ambient temperature of the vehicle.

11. A method comprising:

receiving an air-ground signal indicating an in-air mode which indicates a vehicle is airborne from a landing gear of the vehicle; and energizing a first heating element in a stowable seat in response to the air-ground signal indicating the in-air-mode which indicates the vehicle is airborne; and energizing a floor heating panel located, when the seat is unstowed, at least partially under the seat, in response to the air-ground signal indicating the in-air mode which indicates the vehicle is airborne.

12. The method of claim 11, further comprising receiving an input indicative of an environmental control system parameter for the vehicle, wherein energizing the first heating element and energizing the floor heating panel is further based on the input indicative of the environmental control system parameter.

13. The method of claim 12, wherein the input indicative of the environmental control system parameter comprises an indication of the status of an air conditioning pack.

14. The method of claim 11, further comprising receiving an input indicative of a temperature of the seat, wherein energizing the first heating element and energizing the floor heating panel is further based on the input indicative of the temperature of the stowable seat.

15. The method of claim 11, further comprising receiving an input indicative of ambient temperature of the vehicle, wherein energizing the first heating element and energizing the floor heating panel the stowable seat is further based on the input indicative of the ambient temperature of the vehicle.

\* \* \* \* \*